United States Patent Office 3,271,156
Patented Sept. 6, 1966

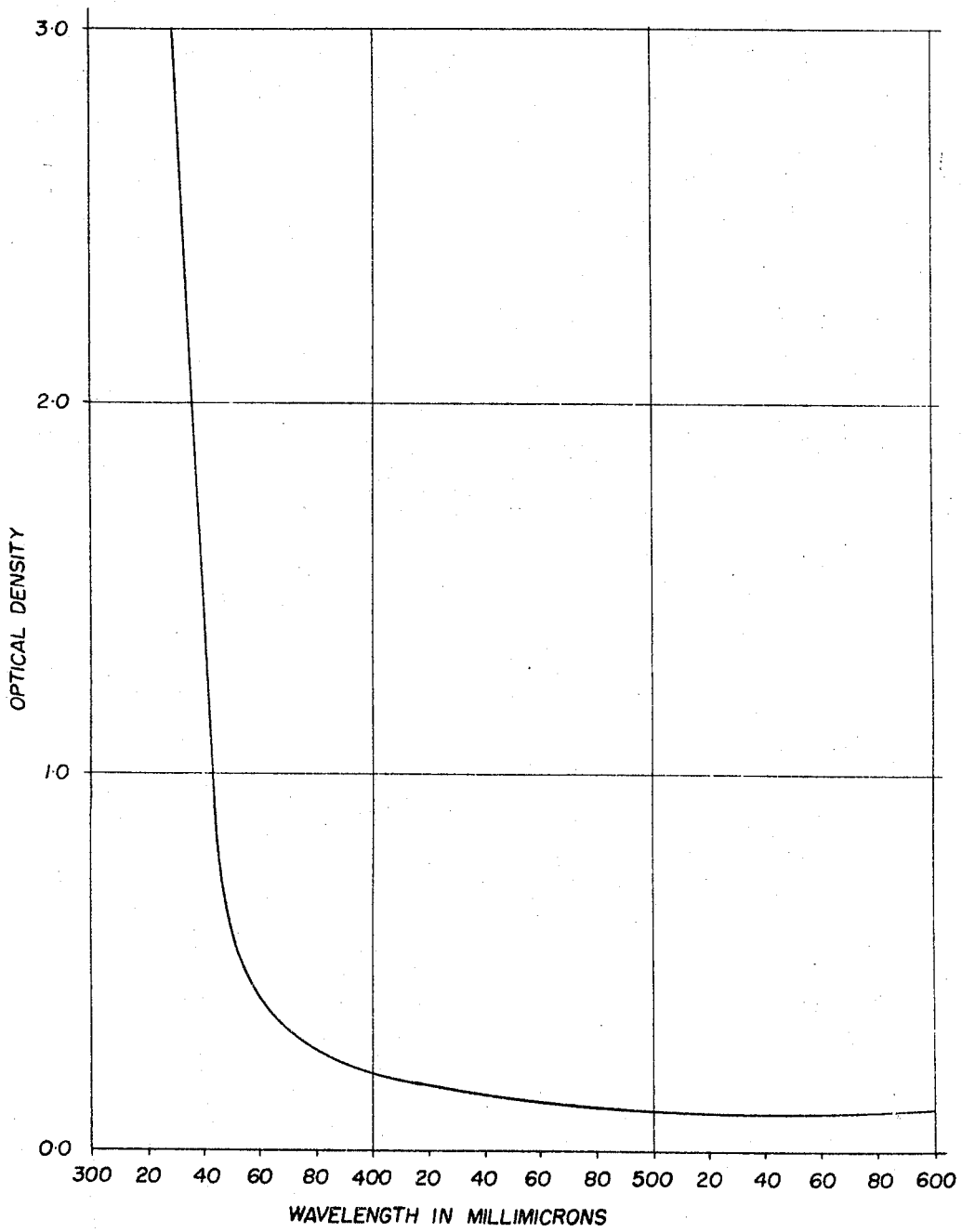

3,271,156
PHOTOGRAPHIC ELEMENT
George W. Sawdey, Rochester, N.Y., assignor to Eastman Kodak Company, Rochester, N.Y., a corporation of New Jersey
Filed Sept. 27, 1965, Ser. No. 494,301
6 Claims. (Cl. 96—84)

This application is a continuation-in-part of U.S. patent application Serial No. 394,431, filed September 4, 1964, now abandoned.

The present invention relates to novel ultraviolet absorbers and to the method of synthesizing such compounds. It also relates to photographic elements containing these compounds.

Although a large number of ultraviolet absorbers are known, there is a need for compounds which have good absorption in the near ultraviolet region of the spectrum (i.e., 360–400 m$\mu$), but low absorption in the visible region. Such compounds would have wide utility, such as in photographic elements, and particularly color photographic elements where it is necessary to provide good ultraviolet protection for the image dyes, and, at the same time, to avoid the yellow color present when many of the commonly known ultraviolet absorbers are used, i.e., compounds which absorb radiation in the visible region of the spectrum as well as in the near ultraviolet region.

One object of my invention is to provide novel non-fluorescing ultraviolet absorbers. Another object is to provide such compounds having good absorption in the near ultraviolet region of the spectrum and low absorption in the visible region. Another object of my invention is to provide a method for preparing such compounds. A further object of my invention is to provide photographic elements containing novel non-fluorescing ultraviolet absorbers. Other objects of my invention will appear herein.

These and other objects of my invention are accomplished with transparent, non-fluorescing ultraviolet absorbers containing an acenaphthenotriazole nucleus. I have found that these compounds, because of the presence of the third fused ring, have high absorption of radiation in the near ultraviolet region of the spectrum, but low absorption of radiation in the visible region of the spectrum. Typical useful compounds include non-fluorescing 2-arylacenaphthenotriazoles having the following formula:

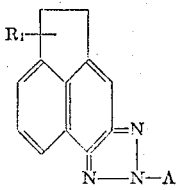

wherein A represents a substituent selected from the group consisting of

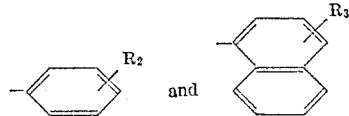

and R$_1$, R$_2$ and R$_3$ each are independently selected from the group consisting of a hydrogen atom, a halogen atom such as chlorine, bromine, iodine, etc., a nitro group, an alkyl group having from 1 to 18 carbon atoms, such as methyl, ethyl, propyl, isopropyl, aminopropyl, butyl, sec-butyl, chlorobutyl, amyl, isoamyl, hexyl, octyl, nonyl, stearamidobutyl, decyl dodecyl, pentadecyl, octadecyl, cyclohexyl, benzyl, phenylethyl, phenylpropyl, etc., and alkoxy group having from 1 to 18 carbon atoms, such as methoxy, propoxy, chlorobutoxy, decoxy, nonoxy, diamylphenoxyethoxy, pentadecoxy, octadecoxy, carbomethoxy, carbobutoxy, carbodecoxy, etc., and aryl groups, such as phenyl, 4-methylphenyl, 4-ethoxyphenyl, 3-hexocyphenyl, etc., and an aryloxy group, such as phenoxy, 4-methylphenoxy, 3-amylphenoxy, etc., and groups imparting water solubility, or solubility in acidic or basic solutions, for example, groups such as carboxyl, sulfo, amino and the like.

The non-fluorescing 2-arylacenaphthenotraizoles employed in my invention can be prepared by diazotizing an aminobenzene or an aminonaphthalene and coupling the diazo compound with a 4-aminoacenaphthene or a 5-aminoacenaphthene free to couple in, respectively, the 5- or 4- position.

I have further found that the non-fluorescing acenaphthenotriazole ultraviolet absorbers of my invention are highly useful ultraviolet absorbers in photographic elements, particularly photographic elements containing dyes susceptible to deterioration upon exposure to ultraviolet radiation, since the compounds of the invention have high absorption of radiation in the near ultraviolet region of the spectrum, but low absorption of radiation in the visible region. Thus, the compounds of this invention unexpectedly avoid the yellow color exhibited by some of the prior art ultraviolet absorbers (i.e., compounds which absorb radiation in the visible spectrum as well as in the near ultraviolet region). The fact that the compounds of the invention have good absorption in the near ultraviolet region of the spectrum (i.e., 360–400 m$\mu$), and substantially no absorption in the visible specturm, is unexpected since closely related compounds, such as 2-arylbenzotriazoles and 2-arylnaphthenotriazoles, absorb visible radiation and thus cause photographic elements, as well as other compositions in which such compounds are added for ultraviolet protection, to be yellow in color. The presence of the third fused ring in the subject compounds unexpectedly causes the high absorption of near ultraviolet radiation while eliminating any substantial absorption of visible radiation.

My invention will be further illustrated in the following examples. Example 1 shows the method of preparing 2-arylacenaphthenotriazoles in accordance with the invention.

*Example 1*

Seven grams of p-dodecyloxyaniline were dissolved in 14 ml. of concentrated hydrochloric acid, and cooled to 0° C. by addition of ice. To this solution was added dropwise a solution of 1.8 g. of sodium nitrite in 10 ml. of water. The diazonium solution was added slowly to 4.3 g. of 5-aminoacenaphthene in 50 ml. of methanol. The dark blue precipitate was collected and washed with water. Without further purification this material was dissolved in 125 ml. of ethanol in a round bottom flask. To the dark blue solution was added 30 g. of cupric chloride in 35 ml. water and 60 ml. concentrated ammonium hydroxide. The reaction mixture was refluxed with stirring for 15 hours. It was then cooled and neutralized with concentrated hydrochloric acid. The dark brown precipitate was collected and recrystallized first from acetic acid, then from cyclohexane to give 4.6 g. (40%) of cream white needles, M.P. 110–111° C.; 2(p-dodecylphenyl)4,5-acenaphthenotriazole.

The high absorption of near ultraviolet radiation and the very low absorption of radiation in the visible region of the spectrum by the compounds of my invention are shown in Example 2.

Example 2

A dispersion of 2(p-dodecylphenyl)4,5-acenaphthenotriazole in tri-o-cresyl phosphate was incorporated in gelatin, and coated on a clear support at a concentration of 330 milligrams per square foot gelatin, 83 milligrams per square foot of the ultraviolet absorber and 249 milligrams per square foot tri-o-cresyl phosphate.

The coatings prepared in accordance with Example 2 were exposed to radiation and absorption curves were made thereof using the Cary Spectrophotometer. FIG. 1 shows the specular density of the coating from 300 to 600 millimicrons. As may be seen in the figure, the compounds of the invention provide very high absorption of near ultraviolet radiation, but substantially no absorption of radiation in the visible region of the spectrum.

The effect of a gelatin overcoat containing ultraviolet absorbers in accordance with the invention on the sensitivity of a silver halide emulsion is shown in Example 3.

Example 3

A clear support was coated with a gelatin silver bromoiodide emulsion at a concentration of 448 milligrams of gelatin per square foot and 127 milligrams of silver per square foot. This layer was overcoated with a layer containing 495 milligrams of gelatin per square foot, 124 milligrams per square foot of the ultraviolet absorber prepared in accordance with Example 1 dispersed in 372 milligrams per square foot tri-o-cresyl phosphate. Upon exposure in a wedge spectrograph and processing to silver negatives, it was found that the coating was one full stop slower at 360 m$\mu$ than the control which was prepared in exactly the same manner but which did not contain the ultraviolet absorber.

A color photographic element containing the ultraviolet absorbers of the invention is shown in Example 4.

Example 4

A photographic element comprising a paper support had the following coatings thereover: a blue sensitive emulsion containing yellow dye former, green sensitive emulsion containing magenta dye former, gelatin containing 2(p-dodecylphenyl)4,5-acenaphthenotriazole, a red sensitive emulsion containing cyan dye former and a gelatin overcoat. The ultraviolet absorber in accordance with the invention provided excellent protection against ultraviolet radiation for the magenta and yellow dyes in the under layers. In addition, the ultraviolet absorber, since it does not absorb radiation in the visible region of the spectrum, did not add any yellow color to the print. The unexpected nature of my invention is demonstrated by the fact that compounds closely related to those of the invention, such as 2-arylnaphthenotriazoles and 2-arylbenzotriazoles, do absorb radiation in the visible region of the spectrum, thus adding a yellow color to photographic elements in which they are incorporated. Further, these prior art compounds are approximately 20–30% less efficient in their absorption of the near ultraviolet light than are the compounds of my invention.

When employed in photographic elements, it is sometimes advantageous to disperse the ultraviolet absorbers in a solvent, such as the high boiling water immiscible solvents described in U.S. Patent 2,322,027, or low boiling water soluble organic solvent, such as those disclosed in U.S. Patents 2,801,170, U.S. 2,801,171 or 2,949,360. The binders in which the ultraviolet absorbers (or dispersions thereof in various solvents) may be incorporated, include gelatin, cellulose derivatives, such as far hydrolyzed cellulose acetate, water soluble ethanolamine cellulose acetate, polyvinyl compounds, such as polyvinyl alcohol and hydrolyzed polyvinyl acetate, vinyl polymers containing urethane carboxylic acid groups and polymeric materials resulting from polymerizing a protein or a saturated acylated protein with a monomer having a vinyl group as described in U.S. Patent 2,852,382. In photographic elements, the ultraviolet absorbers of the invention may be coated in a wide range of concentrations with good results. A typical useful range is from 20 to 30 milligrams of the ultraviolet absorbing compound per square foot photographic element, with very good results being achieved with from 75 to 160 milligrams per square foot. The optimum coating concentrations depend on the particular photographic element to be protected and the amount of protection desired.

Photographic print materials containing dyes may be protected against ultraviolet radiation by a transparent over-coating, e.g., a lacquer, or a hydrophilic colloid coating such as gelatin, containing an ultraviolet absorber of the invention.

The ultraviolet absorbers of my invention may also be advantageously incorporated in a wide variety of substances which are susceptible to deterioration on exposure to ultraviolet light. Thus, the compounds of the invention are advantageously incorporated in cellulose esters and ethers, such as cellulose acetate butyrate or ethyl cellulose, polyolefins such as polyethylene and polypropylene, polystyrene, polyesters such as polyethylene terephthalate, polyamines, polyurethanes, vinyl polymers such as polyvinylchloride, and the like.

It is important that the acenaphthenotriazoles employed in photographic elements in accordance with the invention should be non-fluorescing. Fluorescing compounds, e.g., optical brightening agents, are unsuitable either as taking filters or protective filters for photographic elements. When fluorescing compounds are used as taking filters, ultraviolet radiation is converted to blue radiation and recorded by the photographic element, thus causing the production of an image of the ultra-violet radiation. When used as protective filters, fluorescing compounds cause an undesirable blue haze when the print is viewed in the presence of ultraviolet radiation. This is, of course especially objectionable when viewing color prints.

This invention has been described in detail with particular reference to preferred embodiments thereof, but it will be understood that variations and modifications can be effected within the spirit and scope of the invention as described hereinabove and as defined in the appended claims.

I claim:

1. A photographic element having a dye image protected against ultraviolet radiation by a transparent over-coating containing a non-fluorescing ultraviolet absorber having an acenaphthenotriazole nucleus.

2. A photographic element having a dye image protected against ultraviolet radiation by a transparent over-coating containing a non-fluorescing 2-arylacenaphthenotriazole.

3. A photographic element having a light sensitive silver halide layer and a hydrophilic colloid coating thereover having incorporated therein a non-fluorescing ultraviolet absorber having the following general formula:

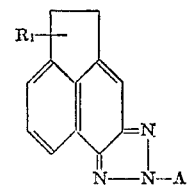

wherein A represents a substituent selected from the group consisting of

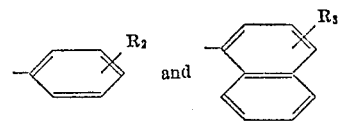

and $R_1$, $R_2$ and $R_3$ are selected from a group consisting of a hydrogen atom, a halogen atom, a nitro group, an amino group, a carboxyl group, a sulfo group, an alkyl group having 1 to 18 carbon atoms, an alkoxy group having 1 to 18 carbon atoms, an aryl group, and aryloxy groups having from 1 to 18 carbon atoms.

4. A photographic element comprising a support having a light sensitive silver halide coating thereon and in association therewith a dye former, and an overcoating to protect the dye against ultraviolet radiation comprising a hydrophilic coating having incorporated therein a compound having the following general formula:

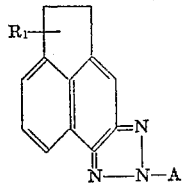

wherein A represents a substituent selected from the group consisting of

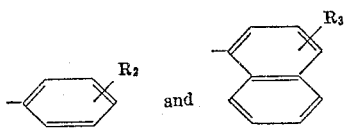

and $R_1$, $R_2$ and $R_3$ are selected from a group consisting of a hydrogen atom, a halogen atom, a nitro group, an amino group, a carboxyl group, a sulfo group, an alkyl group having 1 to 18 carbon atoms, an alkoxy group having 1 to 18 carbon atoms, an aryl group, and aryloxy groups having from 1 to 18 carbon atoms.

5. A photographic element comprising a support having a gelatin silver halide emulsion thereon containing a dye former, and a protective gelatin overcoat having incorporated therein from 75 to 160 milligrams per square foot of 2-(p-dodecylphenyl)-4,5-acenaphthenotriazole.

6. A photographic element having a dye image protected against ultraviolet radiation by a transparent overcoating containing a non-fluorescing ultraviolet absorbing compound having the following formula:

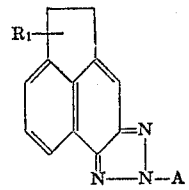

wherein A represents a substituent selected from the group consisting of

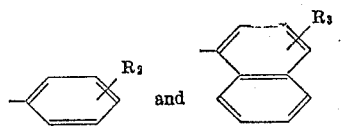

and $R_1$, $R_2$ and $R_3$ are selected from a group consisting of a hydrogen atom, a halogen atom, a nitro group, an amino group, a carboxyl group, a sulfo group, an alkyl group having 1 to 18 carbon atoms, an alkoxy group having 1 to 18 carbon atoms, an aryl group, and aryloxy groups having from 1 to 18 carbon atoms.

No references cited.

NORMAN G. TORCHIN, *Primary Examiner.*

R. H. SMITH, *Assistant Examiner.*